(12) United States Patent
Xu et al.

(10) Patent No.: US 9,867,186 B2
(45) Date of Patent: Jan. 9, 2018

(54) WIRELESS COMMUNICATION METHOD, BASE STATION AND WIRELESS COMMUNICATION DEVICE

(71) Applicant: SONY CORPORATION, Tokyo (JP)

(72) Inventors: Xiaodong Xu, Beijing (CN); Danting Zhang, Beijing (CN); Da Wang, Beijing (CN); Chengcheng Yang, Beijing (CN); Hiroaki Takano, Tokyo (JP); Zhongbin Qin, Beijing (CN)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 14/764,770

(22) PCT Filed: Dec. 26, 2013

(86) PCT No.: PCT/CN2013/090522
§ 371 (c)(1),
(2) Date: Jul. 30, 2015

(87) PCT Pub. No.: WO2014/121641
PCT Pub. Date: Aug. 14, 2014

(65) Prior Publication Data
US 2015/0373719 A1    Dec. 24, 2015

(30) Foreign Application Priority Data
Feb. 6, 2013    (CN) .......................... 2013 1 0048761

(51) Int. Cl.
*H04W 4/00*    (2009.01)
*H04W 72/04*    (2009.01)
(Continued)

(52) U.S. Cl.
CPC ....... *H04W 72/0453* (2013.01); *H04W 72/04* (2013.01); *H04W 72/042* (2013.01); *H04W 76/023* (2013.01); *H04W 84/20* (2013.01)

(58) Field of Classification Search
None
See application file for complete search history.

(56) References Cited

U.S. PATENT DOCUMENTS

2011/0151887 A1\* 6/2011 Hakola ............. H04W 72/0453
455/452.2
2012/0020213 A1    1/2012 Horneman et al.
(Continued)

FOREIGN PATENT DOCUMENTS

CN    101772199 A    7/2010
CN    102123496 A    7/2011
(Continued)

OTHER PUBLICATIONS

International Search Report dated Mar. 27, 2014 in PCT/CN13/090522 Filed Dec. 26, 2013.

*Primary Examiner* — Edan Orgad
*Assistant Examiner* — Rebecca Song
(74) *Attorney, Agent, or Firm* — Oblon, McClelland, Maier & Neustadt, L.L.P.

(57) ABSTRACT

A wireless communication method, a base station and a wireless communication device. The wireless communication method includes: in case that communication devices which are to perform communication are estimated to satisfy a condition for device-to-device direct communication, transmitting a control signaling from a base station to the communication devices, the control signaling allocating a carrier for the device-to-device direct communication; and performing the device-to-device direct communication between the communication devices using the allocated carrier, wherein the base station allocates the carrier for the device-to-device direct communication from conventional carrier, stand-alone new-type carrier and non-stand-alone new-type carrier, wherein the new-type carrier has a reduced (Continued)

number of control channels as compared with the conventional carrier.

18 Claims, 9 Drawing Sheets

(51) Int. Cl.
*H04W 76/02* (2009.01)
*H04W 84/20* (2009.01)

(56) References Cited

U.S. PATENT DOCUMENTS

| | | | | |
|---|---|---|---|---|
| 2012/0093098 | A1* | 4/2012 | Charbit | H04W 72/04 |
| | | | | 370/329 |
| 2013/0005377 | A1* | 1/2013 | Wang | H04W 72/0406 |
| | | | | 455/509 |
| 2014/0185495 | A1* | 7/2014 | Kuchibhotla | H04W 76/023 |
| | | | | 370/281 |
| 2014/0241265 | A1* | 8/2014 | Pragada | H04W 72/04 |
| | | | | 370/329 |
| 2014/0247802 | A1* | 9/2014 | Wijting | H04W 76/023 |
| | | | | 370/329 |
| 2014/0254567 | A1* | 9/2014 | Han | H04W 56/00 |
| | | | | 370/336 |

FOREIGN PATENT DOCUMENTS

| | | |
|---|---|---|
| CN | 102422703 A | 4/2012 |
| CN | 102792759 A | 11/2012 |

* cited by examiner

WIRELESS COMMUNICATION METHOD, BASE STATION AND WIRELESS COMMUNICATION DEVICE

FIELD

The present application relates to the field of wireless communication, and in particular to a wireless communication method, a base station and a wireless communication device for performing Device-to-device direct (D2D) communication by using a new-type carrier.

BACKGROUND

In the next generation of broadband cellular mobile communication system (IMT-Advanced), a base station (eNB) centered communication is limited due to, e.g., the problems of coverage performance and capacity of eNB and so on. With the rapid increase in requirement from various multi-media communications such as high-rate data service including local broadcast, inter-group instant high-density data communication, exchange of a large amount of information and the like, the capacity and frequency spectrum in the conventional communication manner has approached the upper limit. In a future wireless cellular network, the battery usage time of a mobile handheld terminal performing communication depends on the power usage efficiency, and the communication rate under a limited frequency spectrum resource depends on the frequency spectrum efficiency. How to balance the power usage efficiency and the frequency spectrum is an issue mainly researched for the current mobile communication systems.

D2D communication between terminals is a new technology in which terminals communicate directly with each other by multiplexing resources within a cell to improve the total performance of the system. Introducing D2D technology into the evolution of IMT-advanced may leads to an improved network structure, an enhanced coverage and an increased system capacity. D2D communication will bring about a series of improvements and optimizations on the original system. D2D communication has the following advantages: the system capacity is improved, the frequency spectrum is multiplexed to improve the frequency spectrum usage efficiency, the scarcity of available frequency resource is remitted, a load pressure on an eNB from a short-distance intensive data communication is reduced, a rapid resource management with higher time-frequency resolution can be satisfied by reduced control channels, as well as improved network structure, enhanced coverage, improved user fairness, improved wireless network service quality, consolidated lower structure, development of new type of services and the like.

SUMMARY

The following presents a brief summary of the invention to provide a basic understanding of some aspects of the invention. It should be understood that, this summary is not an exhaustive overview of the invention. It is not intended to identify key or critical elements of the invention, nor to limit the scope of the disclosure. Its purpose is only to present some concepts in a simplified form as a prelude to the more detailed description that is discussed later.

In an aspect of the present application, a wireless communication method includes: in case that communication devices which are to perform communication are estimated to satisfy a condition for device-to-device direct communication, transmitting a control signaling from a base station to the communication devices, the control signaling allocating a carrier for the device-to-device direct communication; and performing the device-to-device direct communication between the communication devices using the allocated carrier, wherein the base station allocates the carrier for the device-to-device direct communication from conventional carrier, stand-alone new-type carrier and non-stand-alone new-type carrier, wherein the new-type carrier has a reduced number of control channels as compared with the conventional carrier.

In another aspect of the present application, a method for controlling a wireless communication by a base station includes: determining whether communication devices which are to perform communication satisfy a condition for device-to-device direct communication; and in case that the condition is satisfied, transmitting a control signaling to the communication devices, the control signaling allocating a carrier for the device-to-device direct communication, wherein the base station allocates the carrier for the device-to-device direct communication from conventional carrier, stand-alone new-type carrier and non-stand-alone new-type carrier, wherein the new-type carrier has a reduced number of control channels as compared with the conventional carrier.

In yet another aspect of the present application, a method for performing a wireless communication by a communication device includes: receiving a control signaling from a base station, the control signaling allocating a carrier for device-to-device direct communication; and performing the device-to-device direct communication with an object communication device using the allocated carrier, wherein the carrier for the device-to-device direct communication includes carrier for the device-to-device direct communication allocated from conventional carrier, stand-alone new-type carrier and non-stand-alone new-type carrier, wherein the new-type carrier has a reduced number of control channels as compared with the conventional carrier.

In a further aspect of the present application, a base station includes: a condition determination unit configured to determine whether communication devices which are to perform communication satisfy a condition for device-to-device direct communication; and a control signaling transmitting unit configured to, in case that the condition is satisfied, transmit a control signaling to the communication devices, the control signaling allocating a carrier for the device-to-device direct communication, wherein the carrier for the device-to-device direct communication includes carrier for the device-to-device direct communication allocated from conventional carrier, stand-alone new-type carrier and non-stand-alone new-type carrier, wherein the new-type carrier has a reduced number of control channels as compared with the conventional carrier.

In a yet further aspect of the present application, a wireless communication device includes: a control signaling receiving unit configured to receive a control signaling from a base station, the control signaling allocating a carrier for device-to-device direct communication; and a device-to-device direct communication unit configured to perform the device-to-device direct communication using the allocated carrier with a communication device initiating a communication, wherein the carrier for the device-to-device direct communication includes carrier for the device-to-device direct communication allocated from conventional carrier, stand-alone new-type carrier and non-stand-alone new-type carrier, wherein the new-type carrier has a reduced number of control channels as compared with the conventional carrier.

Moreover, the present application further provides a communication system consisting of wireless communication devices and base station described above.

With the wireless communication method and the wireless communication device according to the present application, D2D communication is performed by using the new-type carrier, so that the wireless communication system has increased bandwidth extendibility to be applicable to more communication scenarios in the future. In addition, the frequency spectrum usage rate can be increased since the adopted new-type carrier has reduced control channels as compared with the conventional carrier. Accordingly, an operation which is more flexible, more energy saving and having lower overhead can be realized.

BRIEF DESCRIPTION OF THE DRAWINGS

The invention will be better understood by making reference to the following description in conjunction with the drawings, and the same reference numbers will be used throughout the drawings to represent the same or similar parts. The drawings together with the detailed description below are contained in the specification and form part of the specification, serve to further illustrate preferable embodiments of the invention and to explain principles and advantages of the invention. In the drawings.

DETAILED DESCRIPTION

In the following, embodiments of the invention will be described in conjunction with the drawings. Elements and features depicted in one drawing or embodiment of the invention may be combined with elements and features depicted in one or more other drawings or embodiments. It should be noted that, for clarity, representations and descriptions of parts and processes which are irrelevant to the invention and known by those skilled in the art are omitted from the drawings and descriptions.

In the following, a wireless communication method according to an embodiment of the invention is described with reference to the flowchart in FIG. 1.

Figure 1:
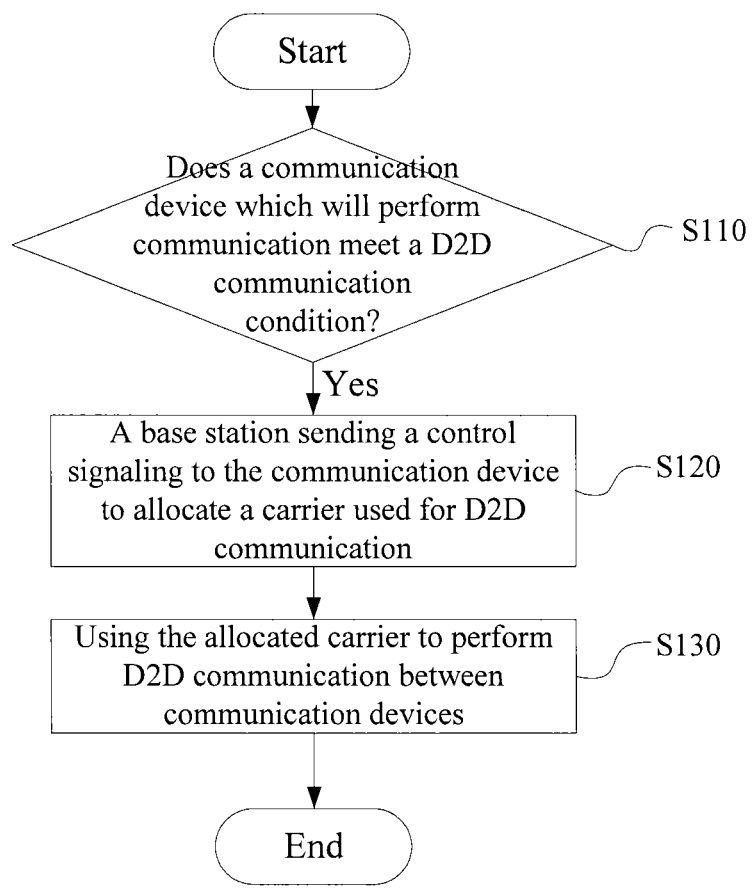
FIG. 1 is a flowchart illustrating a processing example of a wireless communication method according to an embodiment of the invention.

As shown in FIG. 1, in a case that a communication is to be initiated between communication devices, it is determined whether a communication device initiating the communication and a target communication device meet a D2D communication condition (S110).

Generally, D2D communication can be performed only if the communication device serving as the target of a communication and the communication device initiating the communication are located in the same cell or neighboring cells. The "cell" may include a macrocell, a microcell, a picocell, a home eNodeB (HeNodeB, HeNB) cell or a relay node cell or the like, but not be limited thereto.

For example, it may be determined whether the target communication device and the initiating communication device are located in neighboring cells based on a list of neighboring cells of the cell in which the communication device initiating the communication is located. A preliminary condition for establishing a D2D connection is met if a cell in which the target communication device is located is included in the list of neighboring cells of the cell in which the initiating communication device is located. The specific method for establishing a list of neighboring cells may includes: for example, controlling a base station corresponding to an initiating communication device to detect adjacent cells, performing a priority ranking by performing a weight calculation on the distances and signal intensities of the cells, and determining the cell of which the priority is higher than a predetermined level as a neighboring cell.

In addition, the D2D communication condition may further includes one or more of: relative movement states of the communication initiating device and the communication target device, whether the communication devices support D2D communication, user security permissions of the communication devices (for example, performing a security detection on a communication link of the communication device to ensure the legality and validity of communication data) and the data volume to be transmitted in the communication (for example, initiating D2D communication only in a case that an estimated data volume to be transmitted is larger than a predetermined threshold). Where the movement state includes at least one of: location information, moving direction or moving rate.

For example, the D2D communication condition related to the movement state may be determined as follows.

The locations of corresponding communication devices are determined based on Global Navigation Satellite System (GNSS) measurement, cell positioning technique or a combination thereof. The relative distance between corresponding communication devices is determined based on the locations thereof. It is considered that the movement state of the communication devices meet the D2D communication condition if the value of the relative distance is smaller than a preset threshold. For example, the preset threshold of the distance may be determined as a minimal distance with which the communication devices are enabled to perform a D2D communication while meeting a conventional communication quality requirement, or may be determined as a value obtained by adding a predetermined margin to the minimal distance. Wherein, for example, the minimal distance may be determined based on conditions such as the signal transmission power of the communication device and the link condition (e.g., the intensity of a signal received by the communication device). The margin may be determined based on an empirical value. In addition, the cell positioning technique may include positioning based on parameters such as cell identification (Cell-ID), Time Difference Of Arrival (TDOA), Observed Time Difference Of Arrival (OTDOA), and Timing Advance+Angel of Arrival (TA+AoA). The specific positioning method is not the key point of the invention, and will not be described in detail herein for conciseness.

According to a preferable embodiment of the invention, moving directions of the communication devices are further taken into account. Those skilled in the art will know that moving direction information may also be obtained with the above GNSS measurement or cell positioning technique. Specifically, after the locations of the corresponding communication devices are determined, it is judged whether two circles, which respectively center on the communication devices and have certain distances as radiuses, are approaching each other with an AOA meeting the condition and have an intersection, and if so, the relative movement state of the two communication devices are determined to meet the D2D communication condition.

According to an alternative embodiment of the invention, it is judged whether the relative movement state of corresponding communication devices meet the D2D communication condition by considering, at the same time, the location information, moving directions and moving rates of the communication devices. Similar to the moving direction, the moving rate information may also be obtained by the above GNSS measurement or cell positioning technique. Specifically, the relative location of the corresponding communication devices after a predetermined period of time are predicted based on current locations, moving directions and moving rates of the communication devices, and then the possibility for establishing a D2D connection is predicted. For example, in a case that the relative moving direction and rate are considered, a D2D communication distance threshold may be determined with the following expression:

$$L \propto W \times P \times f(v,T)$$

where L represents the D2D communication distance threshold, W represents the signal transmission power of the communication devices, P represents the link condition (such as the intensity of signal received by the communication devices), f(v, T) represents the relative movement state of the communication devices (the value of which is either 0 or 1), v represents the relative moving rate of the communication devices and T represents the relative moving direction (such as approaching or departing) of the communication devices. If the longest relative distance that a user gets to within a estimated calling period (for example, set as 10 minutes) meets a D2D calling distance requirement, then f(v,T)=1 which represents that the D2D communication can be performed. Otherwise, if the relative distance of the user within the estimated calling period does not meet the D2D communication distance requirement, then f(v,T)=0 which represents that the D2D communication cannot be performed.

Of course, the D2D communication condition is not limited to the examples listed above.

An initiating user and a target user may be determined as potential D2D users in a case that the D2D communication condition is met.

If it is determined in step S110 that the D2D communication condition is met, in step 120, a base station transmits a control signaling to the communication devices to allocate a carrier for D2D communication. The base station allocates the carrier for D2D communication from conventional carrier, stand-alone new-type carrier and non-stand-alone new-type carrier, wherein the new-type carrier has reduced control channels as compared with the conventional carrier.

In the following, the New Carrier Type (NCT) is described briefly. In order to satisfy the requirement on improved spectrum efficiency and for fully usage of frequency band, the 3rd Generation Partnership Project (3GPP) proposed a concept of new-type carrier for the bandwidth scalability. The new-type carrier enhances data channels and control channels, such as by changing the carrier structure and reducing related control channels, based on the waste and irrationality of the resource cost in using a current carrier. For example, the new-type carrier may be set as a carrier with one or more of the following control channels removed: Physical Broadcast Channel (PBCH), Physical Downlink Control Channel (PDCCH), Physical HARQ (Hybrid Automatic Repeat Request) Indicator Channel (PHICH), Physical Control Format Indicator Channel (PCFICH), Common Reference Signal (CRS) and physical Downlink Shared Channel (PDSCH).

Furthermore, the NCT may include stand-alone NCT and non-stand-alone NCT. As compared with the conventional carrier, both the stand-alone NCT and the non-stand-alone NCT have reduced control channels, and the control channels of the non-stand-alone NCT are reduced so that the non-stand-alone NCT cannot perform by itself the transmission of control signaling for communication. For the non-stand-alone NCT, the D2D communication may be performed through an aggregated carrier composed of a non-stand-alone NCT and a conventional carrier according to an embodiment of the invention. Wherein, control signaling may be transmitted between the communication devices through the conventional carrier in the aggregated carrier, and data transmission may be performed between the communication devices through the non-stand-alone NCT. Moreover, the conventional carrier composing the aggregated carrier may be further used for communication between communication device and base station.

The base station may transmit the control signaling to the communication devices by broadcasting proprietary information for a specific communication device (such as Radio Resource Control (RRC) signaling or Medium Access Control (MAC) signaling) or system information. The control signaling indicates information on and/or supported frequency range of a carrier which is applicable to the D2D communication. For example, the base station may inform the communication devices in the D2D communication of the following information by using RRC signaling/MAC signaling/system broadcast information/physical layer signaling: which NCT carrier can be used within D2D communication range and/or the supportable frequency ranges of respective NCT carriers. In addition, a corresponding NCT can be set for a communication scenario based on the flexibility of NCT. For example, an appropriate NCT may be set for a communication scenario such as large data volume, accurate control, connection without base station, and cluster sharing, to meet special requirements of respective scenarios.

Next, in step S130, the communication device initiating the communication and the target communication device perform D2D communication using the allocated carrier. For example, the D2D communication may be performed in a communication manner based on Long Term Evolution (LTE) or advanced Long term Evolution (LTE-A), or a communication manner based on wireless local network (WLAN), but it is not limited to the above communication manners.

It should be noted that, the D2D communication mentioned herein may include device-to-device direct data transmission and feasibility detection for the data transmission.

According to the control signaling from the base station, the communication devices may multiplex the carrier allocated for D2D communication in a time-division manner or a frequency-division manner. Specifically, if the carrier for D2D communication is the same as that for device-to-network communication, then the D2D communication and device-to-network communication are performed using the carrier in a time-division multiplexing manner or a frequency-division multiplexing manner. If the carrier for D2D communication is not the same as that for device-to-network communication, then data and signaling related to a network connection control plain (C-plain) are transmitted through the carrier for device-to-network communication, and data and signaling related to a user plain (U-plain) and a control plain of the D2D communication between the communication devices are transmitted through the carrier for D2D communication.

With respect to the frequency-division multiplexing manner, the carrier for D2D communication may be in any frequency band. However, based on characteristics of D2D communication, a high frequency may be used for a short-distance communication so that interference to users communicating using other frequency bands can be reduced. Therefore, the D2D communication may be performed by mainly using a high-frequency carrier. With respect to the time-division multiplexing manner, the distribution of the carrier may be determined based on characteristics of conversation of the user communication. For example, the time actually occupied by the user is only ⅓ of the total time during a call, so a sub-frame distribution manner may be set accordingly. For example, a first communication device uses the first ⅓ sub-frame and a second communication device uses the latter ⅓ sub-frame. Of course, the multiplexing manner which may be adopted in the wireless communication method according to the invention is not limited to the above specific manners.

According to an embodiment of the invention, in a D2D communication, data and signaling which are related to a user plain and a control plain are transmitted directly between communication devices through a carrier for D2D communication, and one of the communication devices may serve as a master communication device to control the D2D communication. In other words, it may be considered that the communication devices for D2D communication form a small cell when performing the D2D communication and the master communication device serves as a base station controlling the small cell.

The master communication device and slave communication device may be determined in various ways. For example, the communication device initiating a communication may be determined as the master communication device by default. Or the master and slave communication devices may be designated based on communication conditions of the communication devices according to a predetermined rule. Accordingly, it may be indicated in a control signaling transmitted from the base station to the communication devices that which communication device serves as the master communication device.

With the communication control method according to the embodiment of the invention, by transferring a data link to the D2D communication, the base station mainly functions to control and monitor. Accordingly, requirements and modes of the link between the base station and users and the link between users are changed. Moreover, by introducing the NCT into the D2D communication and setting a new-type carrier in a D2D communication scenario, advantages of D2D communication may be better exploited and the compatibility and practicality of D2D communication may be realized in a further communication system.

Next, a processing example of step S220 in a wireless communication method according to an embodiment of the invention is described with reference to the flowchart in FIG. 2, in which a processing related to a designation of master and slave communication devices are contained.

Figure 2:
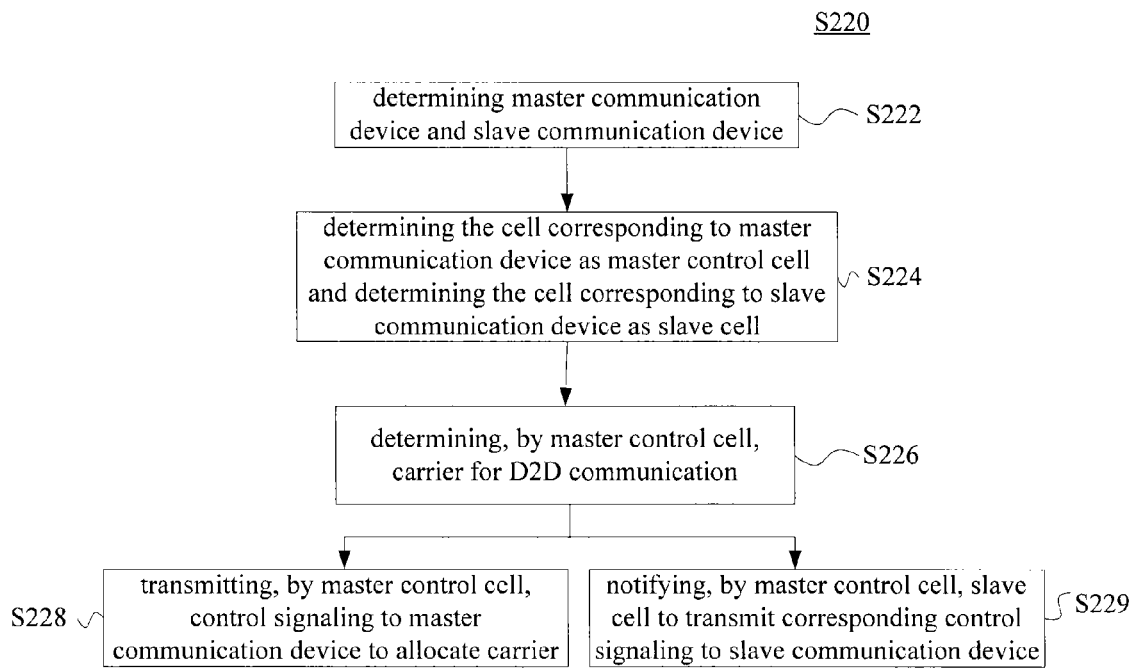
FIG. 2 is a flowchart illustrating a processing example of a step of transmitting a control signaling to a communication device in a wireless communication method according to an embodiment of the invention.

As shown in FIG. 2, in step 222, a master communication device and a slave communication device is determined among communication devices which are to perform a communication. The above determination may be performed by the base station corresponding to the communication device initiating the communication or by the base station corresponding to the target communication device.

Specifically, the master or slave communication device can be determined based on one or more of: the intensity of signal received from corresponding base station, the power loss in transmission of a signal received from the base station, the distance from corresponding base station corresponding, and whether the communication device is a communication initiating device or a communication target device. Wherein, the signal intensity, the power loss and the distance to the base station reflect a communication condition of the communication device. By determining the communication device having a better communication condition as the master communication device, data and signaling related to a network connection control plain can be better transmitted and power loss of the communication device is reduced. Besides, the base station may set by default the communication initiating device or the communication target device as the master communication device, so as to omit the overhead required for selecting the master communication device. For example, the signaling overhead, the complexity for calculating the condition for selecting the master device and resource allocation are reduced. Preferably, the communication initiating device may be set as the master communication device by default, thus the base station sets the communication initiating device as the master communication device upon reception of a communication request from the communication initiating device, so that the master communication device can be determined before searching for a communication target device, so the processing efficiency is further improved.

In a case that the master and slave communication devices are determined, accordingly, the cell corresponding to the master communication device may be determined as a master control cell and the cell corresponding to the slave communication device may be determined as a slave cell (step S224). Next, the master control cell may determine a carrier for D2D communication (step S226) and transmits a control signaling to the master communication device (S228). Further, the master control cell may notify the slave cell to transmit a corresponding control signaling to the slave communication device (S229) to establish a D2D communication link. In addition, after the D2D communication is established, the master control cell and the slave cell may respectively maintain original communication connections between the master and slave communication devices and the network, such as receiving information related to D2D communication state and transmitting other control signaling.

It should be noted that, in a case that the master and slave communication devices are located in the same cell, it may be considered that the cell is both the master control cell and the slave cell. The cell transmits control signaling to the master and slave communication devices to establish a direct communication link between devices and maintain the original communication connections between the master and slave devices and the network, respectively.

In addition, during the D2D communication, based on real-time communication conditions of the communication devices, the master and slave communication devices may be re-determined, and the master control cell and the slave cell are re-determined accordingly.

Figure 3:
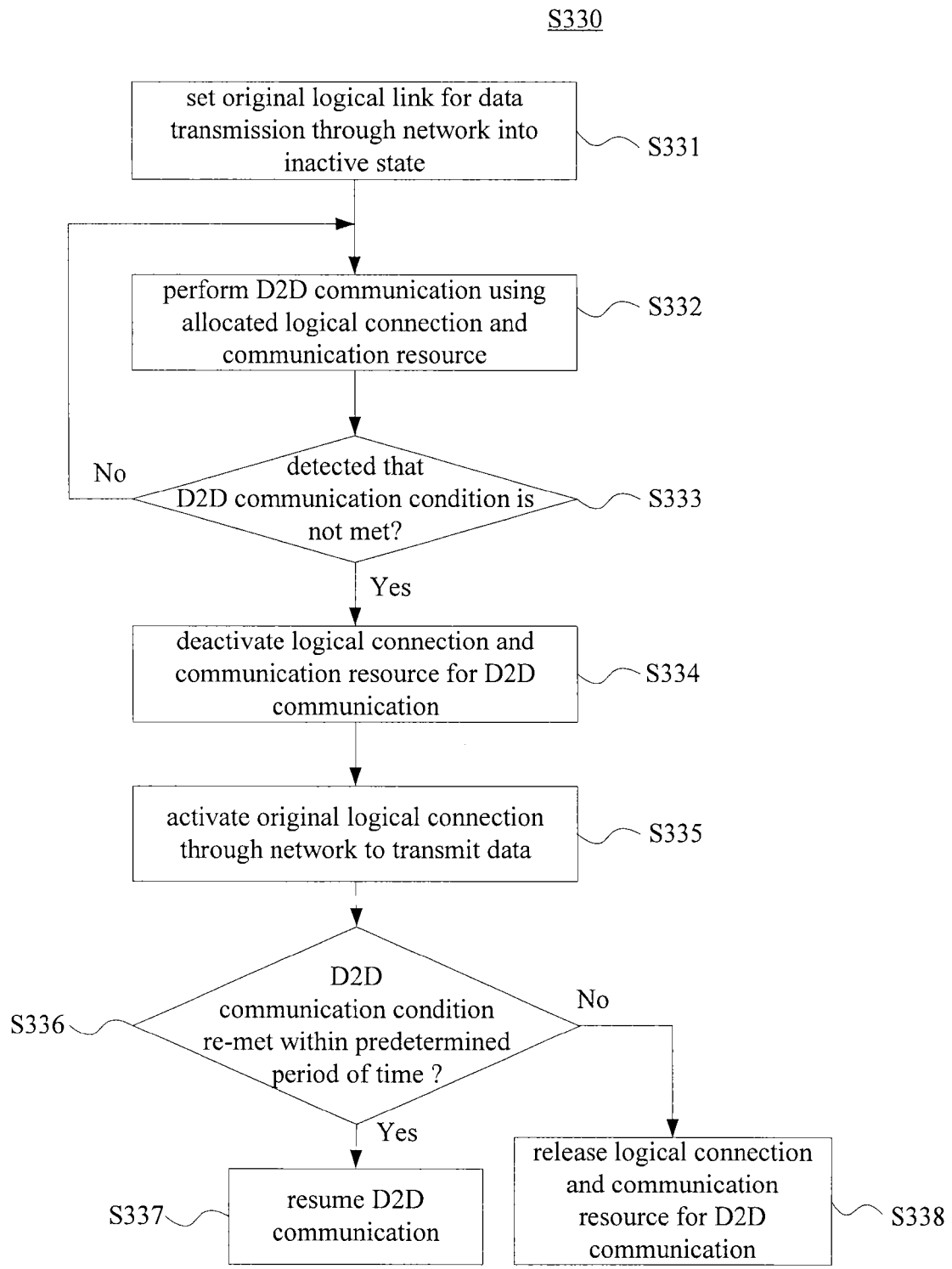
FIG. 3 is a flowchart illustrating a processing example of a step of performing D2D communication by using an allocated carrier in a wireless communication method according to an embodiment of the invention.

Next, a processing example of step S330 in a wireless communication method according to an embodiment of the invention is described by referring to the flowchart in FIG. 3, wherein a D2D communication is performed using the allocated carrier.

In a case of establishing a D2D link with the above process, the original logical link in which data is transmitted through a network may still be maintained but set into an inactive state (S331).

During the D2D communication performed by using an allocated logical connection and communication resource (S332), if it is detected that a D2D communication condition is not met ("Yes" in the determination of S333), the logical connection and communication resource for D2D communication are deactivated (S334) and the original network based logical connection is activated to transmit data (S335). Wherein, the communication devices may detect whether the D2D communication condition is met, and notify the respective cell if the D2D communication condition is not met. Alternatively, the base station of the cell may detect whether the communication devices no longer meet the D2D communication condition.

After the D2D communication is stopped, the logical connection and communication resource for D2D communication may be retained for a predetermined period of time. If the communication devices re-meet the D2D communication condition within the predetermined period of time ("Yes" in the determination of S336), the logical connection and communication resource for D2D communication is re-activated and the logical connection for network data transmission is deactivated, to restore the D2D communication. If the D2D communication condition is still not met after the predetermined period of time ("No" in the determination of S336), the logical connection and communication resource for D2D communication may be released. Therefore, the following problem can be avoided that the communication resource for a D2D communication needs to be re-allocated to restore the D2D communication where the D2D communication is interrupted due to an accidental event.

In the above description of the wireless communication method according to the embodiments of the invention, processes or methods performed on the base station side and on the communication device side are also disclosed. In the following, a summary of these methods are given without repeating certain details discussed above.

Figure 4:
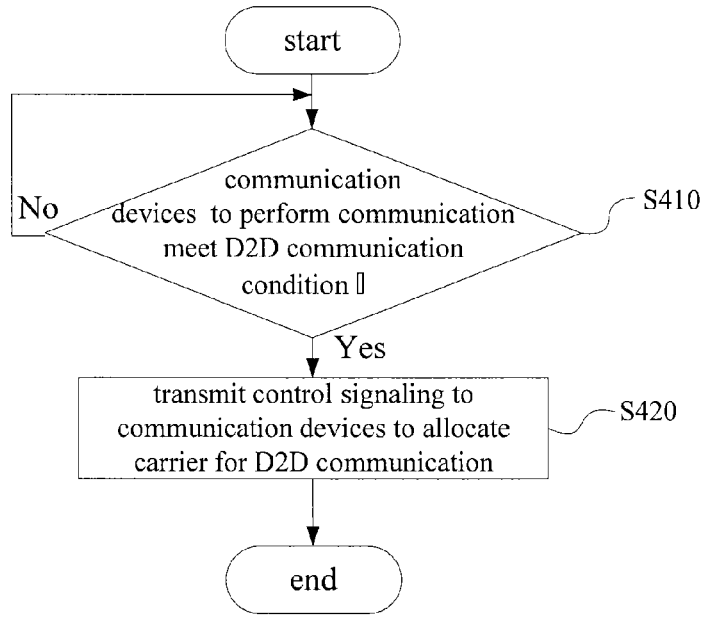
FIG. 4 is a flowchart illustrating a processing example of a method for controlling a wireless communication by a base station according to an embodiment of the invention.

Next, a method for controlling a wireless communication on a base station side according to an embodiment of the invention is described by referring to the flowchart in FIG. 4. Wherein, the base station includes, for example, a macro-cell base station, a micro-cell base station, a pico-cell base station, a home base station or relay node, but is not limited thereto.

As shown in FIG. 4, in a case that a communication device (a communication device initiating a communication and/or a communication device serving as a target of the communication) within the service range of the base station is to perform a communication, it is determined whether a D2D communication condition is met between the communication devices. Specifically, for the communication devices in the same cell or neighboring cells, it may be further determined whether the communication devices meet the D2D communication condition based on the following factors: relative movement state of the communication initiating device and the communication target device, whether the communication devices support D2D communication manner, user security permissions of the communication devices and the amount of data to be transmitted in the communication.

If the communication devices meet the D2D communication condition ("Yes" in the determination in S410), the base station transmits a control signaling to the communication devices by, for example, broadcasting system information or proprietary information such as RRC or MAC, to allocate a carrier for D2D communication (S402). Wherein, the base station allocates the carrier for D2D communication from conventional carrier, stand-alone NCT and non-stand-alone NCT, wherein the new-type carrier has reduced control channels as compared with the conventional carrier. The control signaling may indicate information of a carrier which is applicable to the D2D communication and/or frequency range supported by corresponding carrier. An available NCT carrier may be a carrier dedicated for D2D communication, or a reusable NCT carrier which is being used by other communication devices in a conventional cellular communication.

The base station may indicate information of an aggregated carrier composed of a non-stand-alone NCT and a conventional carrier through a control signaling in a case that the non-stand-alone NCT is to be applied to a D2D communication. The conventional carrier in the aggregated carrier may be designated as a carrier for transmitting control signaling between the communication devices, and the non-stand-alone NCT is used for transmitting data between the communication devices.

It should be noted that, the method performed on the base station side may be performed by a base station corresponding to the cell in which the communication device initiating the communication is located, or performed by a base station corresponding to the cell in which the target communication device is located.

According to an embodiment, the method for controlling the wireless communication by the base station may further include a step of determining master and slave communication devices.

Figure 5:
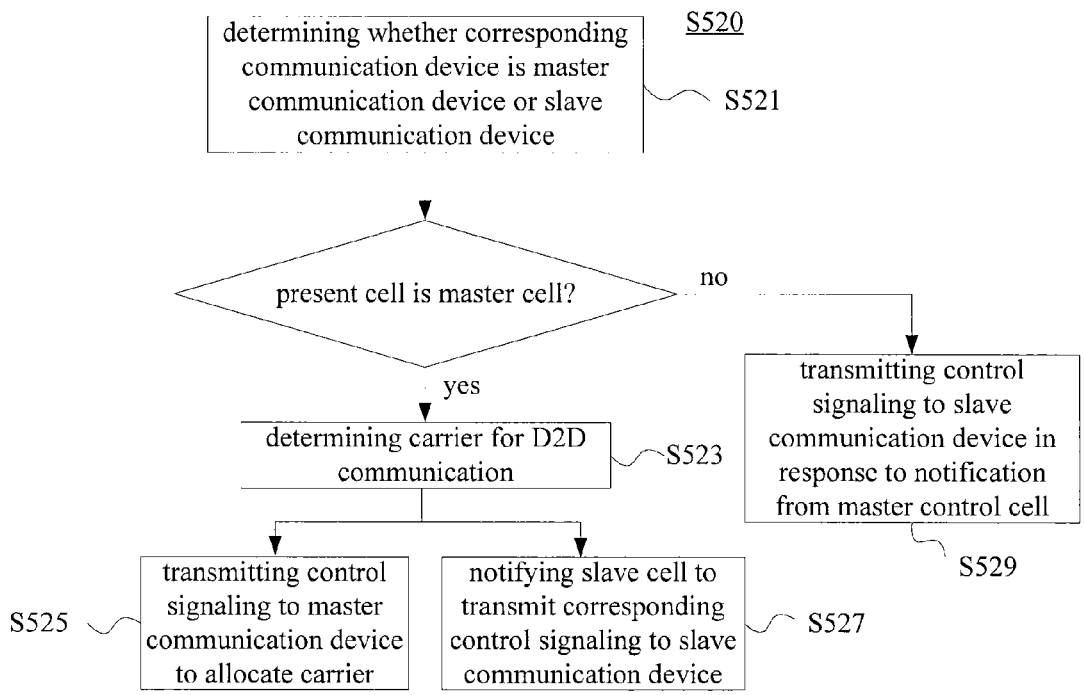
FIG. 5 is a flowchart illustrating a processing example of a step of transmitting a control signaling to a communication device in a method for controlling a wireless communication by a base station according to an embodiment of the invention.

As shown in FIG. 5, in step S521, it is determined whether a communication device corresponding to the base station is a master communication device or a slave communication device. For example, the master communication device or slave communication device can be determined based on: the intensity of signal received from the base station, the power loss in the transmission of the signal received from the base station, the distance from the base station. Besides, as mentioned above, the communication device initiating the communication or the target communication device may be determined as the master communication device by default.

In a case that the communication device is the master communication device, the base station can be determined as the base station of master control cell. Accordingly, the base station determines a carrier for D2D communication (S523), transmits a control signaling to the master communication device to allocate the carrier for D2D communication (S525), and notifies the slave cell to send corresponding control signaling to the slave communication device (S527). Wherein, the control signaling may also designate the master communication device to perform control in the D2D communication. Accordingly, the base station of master control cell may maintain an original communication connection between the master communication device and the network during the D2D communication.

In a case that the communication device is the slave communication device, it may be determined that the base station is a base station of slave cell. Accordingly, in step S529, a control signaling on D2D communication is transmitted to the slave communication device to make it establish a D2D communication link, based on a notification from the master control cell. Accordingly, the base station of slave cell may maintain an original communication connection between the slave communication device and the network during the D2D communication.

Figure 6:
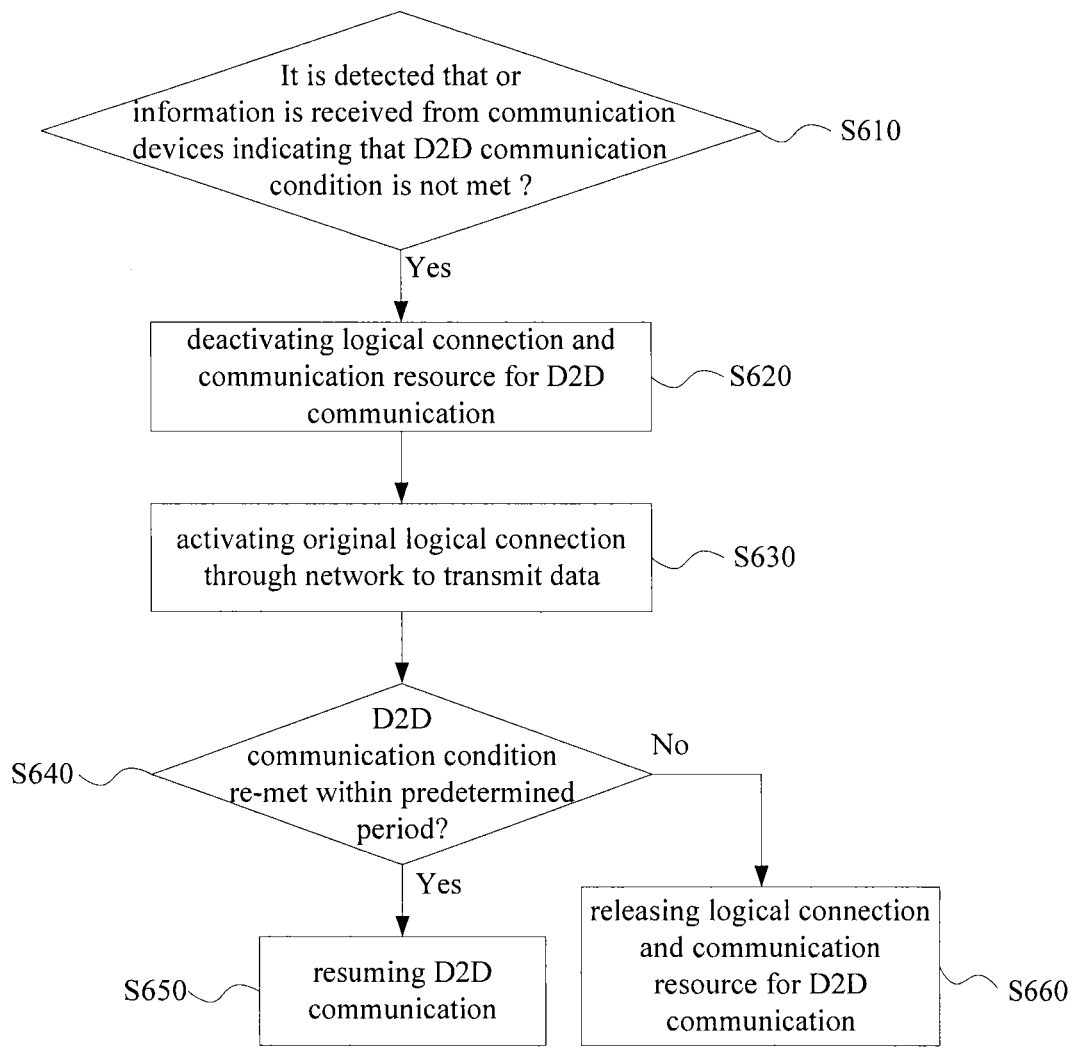
FIG. 6 is a flowchart illustrating a processing example of an additional step of a method for controlling a wireless communication by a base station according to an embodiment of the invention.

Next, a processing example of additional steps in a method for controlling a wireless communication by a base station according to an embodiment of the invention is described by referring to the flowchart in FIG. 6.

In a case that a D2D communication link is established, the base station may determine whether a D2D communication condition is still met between communication devices by detection or based on information from corresponding communication devices.

If it is detected that the communication devices do not meet the D2D communication condition, or information indicating that the D2D communication condition is not met is received from corresponding communication devices ("Yes" in the determination of S610), the base station deactivates the logical connection and the communication resource for D2D communication (S620) and activates an original logical connection through network (S630) to make the communication devices return to the original communication through base station.

After switching the original network communication, the logical connection and communication resource allocated for D2D communication may stay un-released temporarily, and be retained for a predetermined period of time. If the communication devices re-meet the D2D communication condition within the predetermined period of time ("Yes" in the determination of S640), the logical connection and communication resource for D2D communication may be activated and the logical connection for network data transmission is deactivated, to restore the D2D communication (S650). If the D2D communication condition is still not met after the predetermined period of time ("No" in the determination of S640), the logical connection and communication resource for D2D communication are released. Thus, the following problem is avoided that the communication resource needs to be re-allocated to restore a D2D communication in a case that the D2D communication is interrupted due to an accidental event.

Figure 7:
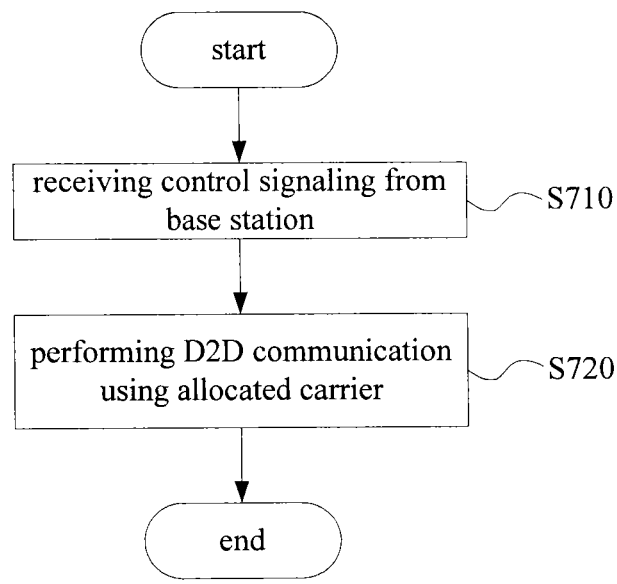
FIG. 7 is a flowchart illustrating a processing example of a method for performing a wireless communication by a communication device according to an embodiment of the invention.

Next, a processing example of a method for performing a wireless communication on a communication device side according to an embodiment of the invention is described by referring to the flowchart in FIG. 7.

In step S710, a communication device receives a control signaling from a base station, the control signaling allocates a carrier for D2D communication. Wherein, the carrier for D2D communication is allocated from conventional carrier, stand-alone NCT and non-stand-alone NCT, wherein the new-type carrier have reduced control channels as compared with the conventional carrier.

In a case that the communication device is the communication initiating device, the control signaling is generated by the base station in response to a communication request from the communication device and in the event that the communication devices meet the D2D communication condition. In a case that the communication device is a target communication device, the control signaling is generated by the base station in response to a communication request to the target communication device and in the event that the communication devices meet the D2D communication condition.

In addition, although it is not shown in the drawing, in order to determine whether the communication device and an object communication device meet the D2D communication condition, prior to step S710, the communication device may perform a peer to peer detection with the object communication device to determine whether the D2D communication condition is met based on a signaling from the base station (e.g., in a case that the communication devices which are to perform the communication are located in the same cell or neighboring cells, a signaling of further determining whether the D2D communication condition is met is transmitted by the base station to the communication device).

D2D communication may be classified into a cellular master control type and a cellular aided type. In the cellular master control type, a base station mainly controls a D2D communication flow. During establishment of a communication, the base station judges whether the D2D communication condition is met based on measured data such as a distance, a power and a link state reported by a user, and informs the D2D user of the communication link establishment. In the cellular aided type, the cellular base station assists to establish a communication. During establishment of a D2D communication procedure, a communication user device performs an autonomous peer discovery to find a target device of the communication based on a user device probing technique, after the base station permits a D2D communication and allocates a link resource for communication. The invention may adopt the above manners or a combination thereof. Specifically, the communication device may determine whether a D2D communication can be performed, completely based on a detection result and a judging result from the base station, or by performing detection between devices, i.e., peer to peer detection, in response to the signaling from the base station. Alternatively, it can be further determined whether the D2D communication condition is met by performing a peer to peer detection after the base station preliminary determines the communication devices meet the D2D communication condition (for example, it is determined that the communication devices are located in the same cell or neighboring cells).

Regarding the specific way of peer to peer detection, for example, an initiating user searches for a target user with a specific omnidirectional radio broadcast allocated by the base station, and the target user replies the specific broadcast from the initiating user after receiving a base station session notification, thereby it is determined whether the D2D communication condition is met.

Of course, the peer to peer detection performed in the embodiments of the invention is not limited to the above specific manners.

In step S720, the communication device performs D2D communication with the object communication device (the target communication device or the communication device initiating the communication) using the allocated carrier. For example, the communication device may perform the D2D communication in a communication manner based on LTE or LTE-A, or in a communication manner based on WLAN.

In addition, in a case that the control signaling from the base station indicates to perform D2D communication using an aggregated carrier composed of a non-stand-alone carrier and a conventional carrier, the communication device performs the D2D communication with the object communication device through the indicated aggregated carrier. Wherein, a control signaling (including a control signaling for D2D communication with the object communication device and a control signaling transmitted with the base station) is transmitted through the conventional carrier and data transmission with the object communication device is performed through the non-stand-alone NCT.

Moreover, in a case of being designated as the master communication device, the communication device performs control and communicates with the base station during the D2D communication.

Figure 8:
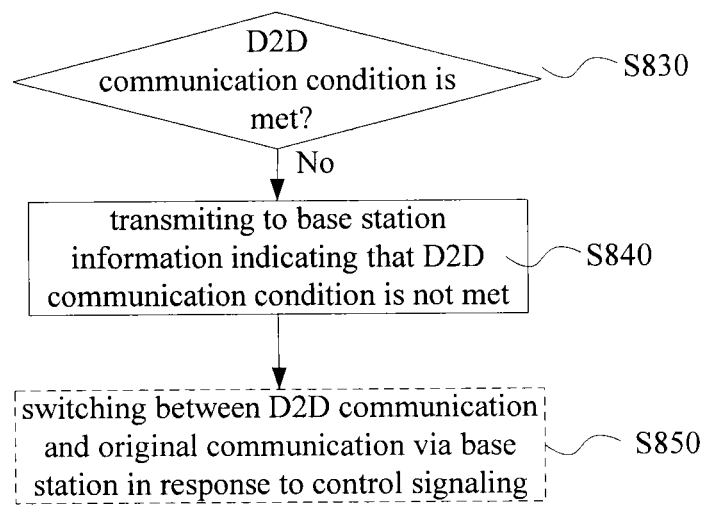
FIG. 8 is a flowchart illustrating a processing example of an additional step of a method for performing a wireless communication by a communication device according to an embodiment of the invention.

FIG. 8 is a flowchart illustrating a processing example of additional steps in a wireless communication method performed on communication device side according to an embodiment of the invention.

During a D2D communication, if it is detected that the D2D communication condition is not met ("No" in the determination of S830), information indicating that the D2D communication condition is not met is transmitted to the base station.

In addition, the communication device may switches between a D2D communication and an original communication via base station, in response to the control signaling from the base station. Specifically, in response to a deactivating signal for D2D communication from the base station, the D2D communication may be stopped, and it is switched into data transmission via base station. Also, the D2D communication may be restored in response to an activating signal for the D2D communication from the base station.

Next, a configuration example of a base station according to an embodiment of the invention is described with reference to FIG. 9. The base station includes, for example, a macro cell base station, a micro cell base station, a pico cell base station, a relay node or a home base station, but is not limited thereto.

A base station 900 according to the embodiment of the invention includes a condition determination unit 910 and a control signaling transmission unit 920. The condition determination unit 910 is configured to determine whether communication devices which are to perform a communication meet a condition for D2D communication. The control signaling transmission unit 920 is configured to, in a case that the D2D communication condition is met, transmit a control signaling to the communication devices to allocate a carrier for the D2D communication. Wherein, the carrier for D2D communication includes a carrier allocated from conventional carrier, stand-alone NCT and non-stand-alone NCT, wherein the new-type carrier has reduced control channels as compared with the conventional carrier.

Figure 10:
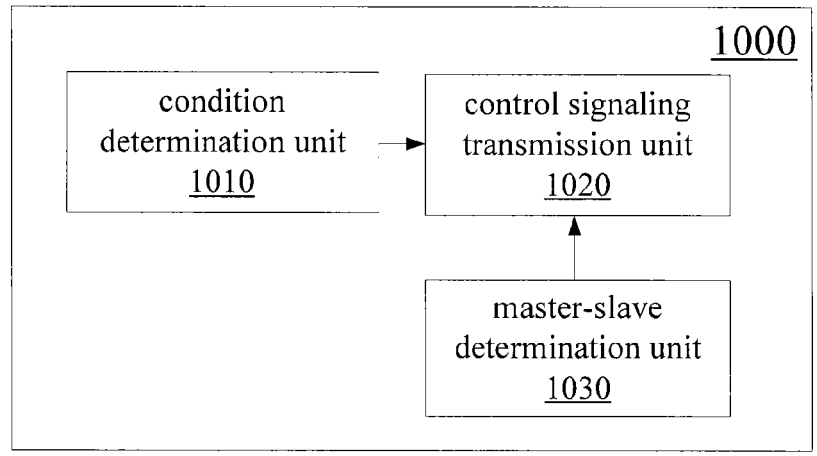
FIG. 10 is a block diagram illustrating another configuration example of a base station according to an embodiment of the invention.

FIG. 10 illustrates a configuration example of a base station according to another embodiment of the invention.

As shown in FIG. 10, a base station 1000 includes a condition determination unit 1010, a control signaling transmission unit 1020 and a master-slave determination unit 1030. Wherein, configurations of the condition determination unit 1010 and the control signaling transmission unit 1020 are similar to those of the condition determination unit and the control signaling transmission unit described above, and will not be described in detail herein.

The master-slave determination unit 1030 is configured to determine a master communication device and a slave communication device in the communication devices. Wherein, the master-slave determination unit 1030 may determine the master and slave communication devices in the manners described above.

In addition, the control signaling transmission unit 1020 is further configured to designate the master and slave communication devices in the control signaling transmitted to the communication devices and designate that the master communication device performs control in the D2D communication.

Figure 11:
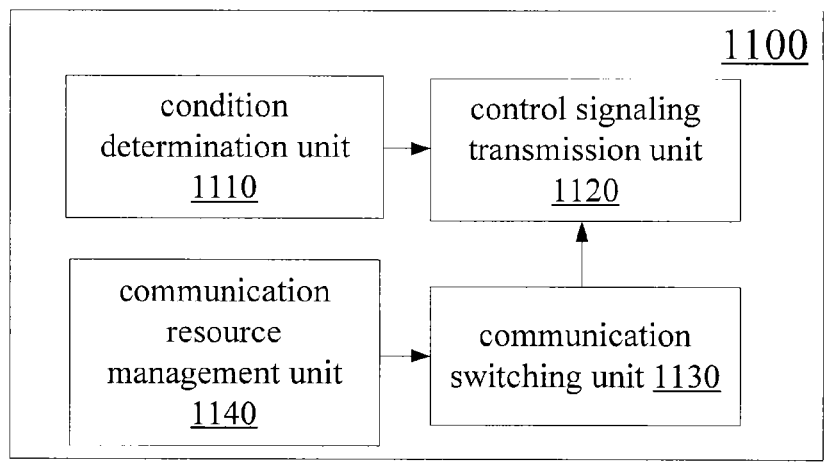
FIG. 11 is a block diagram illustrating yet another configuration example of a base station according to an embodiment of the invention.

FIG. 11 illustrates a configuration example of a base station according to yet another embodiment of the invention.

As shown in FIG. 11, a base station 1100 includes a condition determination unit 1110, a control signaling transmission unit 1120, a communication switching unit 1130 and a communication resource management unit 1140. Configurations of the condition determination unit 1110 and the control signaling transmission unit 1120 are similar to those of the condition determination unit and the control signaling transmission unit described above, and will not be described in detail herein.

The communication switching unit 1130 is configure to make the control signaling transmission unit 1120 transmit a signaling for stopping the D2D communication in case of detecting that a D2D communication condition is not met or receiving information indicating that the D2D communication condition is not met from the communication devices, and to make the control signaling transmission unit 1120 transmit a signaling of restoring the D2D communication in a case that the D2D communication condition is re-met within a predetermined period of time.

The communication resource management unit 1130 is configured to retain the communication resource for D2D communication for a predetermined period of time after the D2D communication is stopped, and to release the communication resource if the D2D communication condition is still not met after the predetermined period of time.

Figure 9:
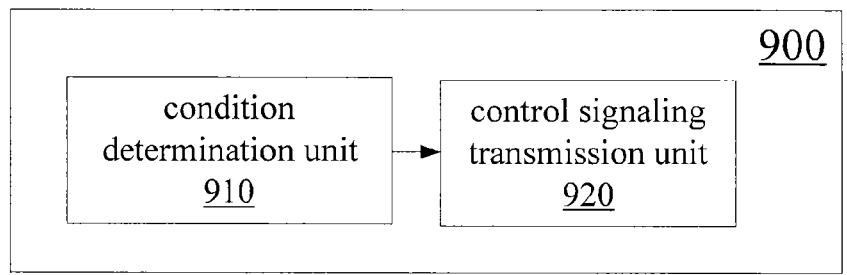
FIG. 9 is a block diagram illustrating a configuration example of a base station according to an embodiment of the invention.

It should be noted that, other possible parts of the base station are omitted in FIGS. 9 to 11 to avoid obscuring the spirit and scope of the invention.

Figure 12:
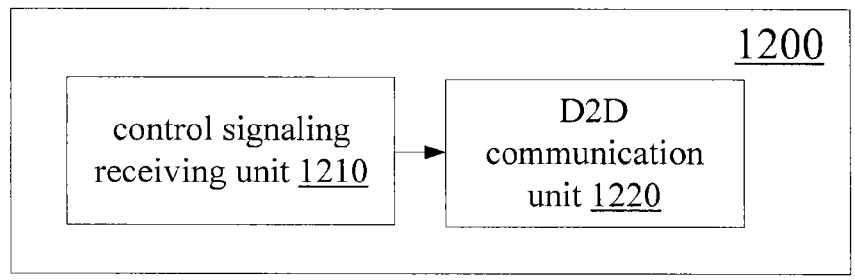
FIG. 12 is a block diagram illustrating a configuration example of a wireless communication device according to an embodiment of the invention.

Next, a configuration example of a wireless communication device according to an embodiment of the invention is described by referring to the block diagram in FIG. 12.

As shown in FIG. 12, a wireless communication device 1200 according to an embodiment of the invention includes a control signaling receiving unit 1210 and a D2D communication unit 1220.

The control signaling receiving unit 1210 is configured to receive a control signaling for allocating a carrier for D2D communication from a base station. The carrier for D2D communication includes a carrier for D2D communication allocated from conventional carrier, stand-alone NCT and non-stand-aloneNCT, wherein the new-type carrier have reduced control channels as compared with the conventional carrier.

The D2D communication unit 1220 is configured to perform D2D communication with an object communication device by using the allocated carrier. For example, the communication device may perform D2D communication by using a communication manner based on LTE or LTE-A, or using a communication manner based on WLAN. In addition, the D2D communication unit 1220 may be further configured to perform control and/or communicate with the base station during the D2D communication in a case that the wireless communication device 1200 is designated as the master communication device.

Figure 13:
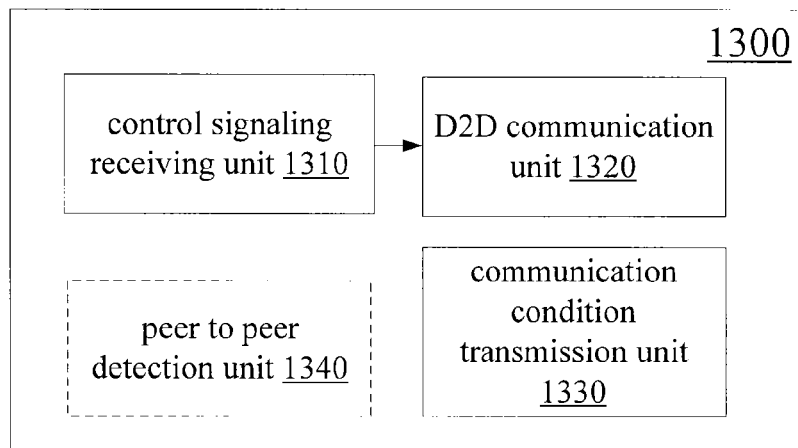
FIG. 13 is a block diagram illustrating another configuration example of a wireless communication device according to an embodiment of the invention.

FIG. 13 illustrates a configuration example of a wireless communication device according to another embodiment of the invention.

As shown in FIG. 13, a wireless communication device 1300 includes a control signaling receiving unit 1310, a D2D communication unit 1320 and a communication condition transmission unit 1330. The control signaling receiving unit 1310 and the D2D communication unit 1320 are similar to the above control signaling receiving unit and D2D communication unit described above, and will not be described in detail herein.

The communication condition transmission unit 1330 is configured to transmit information indicating that a D2D communication condition is not met to a corresponding base station if it is detected during a D2D communication that the D2D communication condition is not met.

Optionally, the wireless communication device 1300 may further include a peer to peer detection unit 1340 configured to perform peer to peer detection on the object communication device to determine whether the D2D communication condition is met, in response to a signaling from the base station.

It should be noted that, other possible parts of the wireless communication device are omitted in FIGS. 12 and 13 to avoid obscuring the spirit and scope of the invention.

Figure 14A:
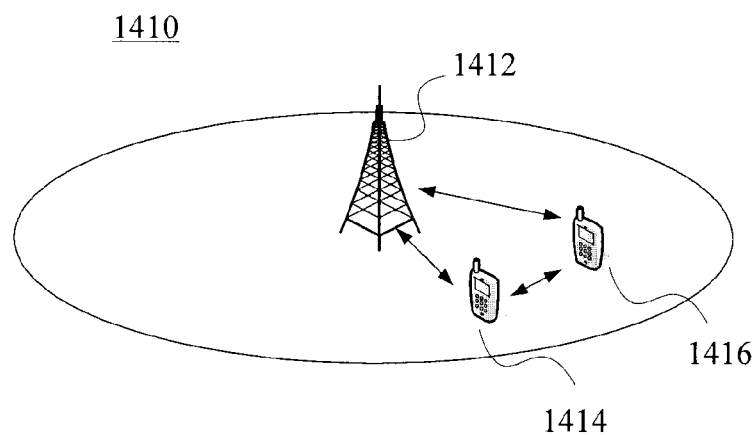
FIGS. 14A, 14B are schematic diagrams illustrating a wireless communication system according to an embodiment of the invention.
Figure 14B:
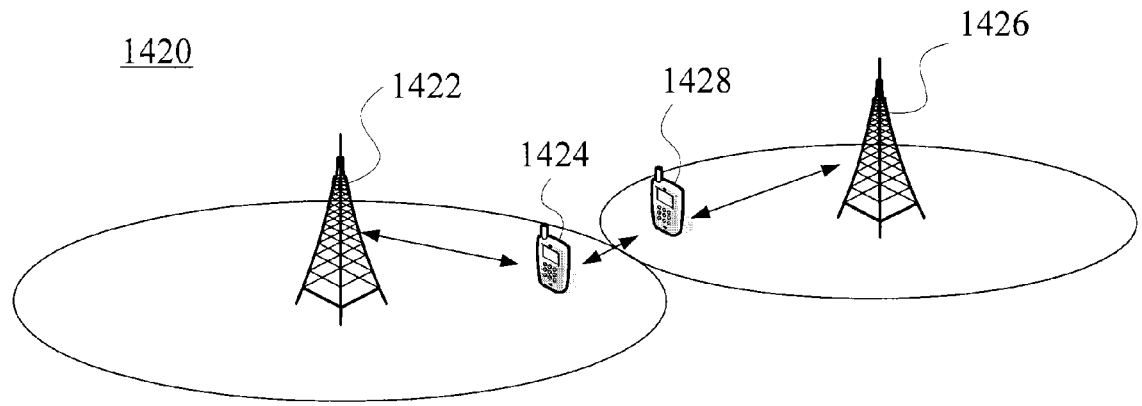

Embodiments of the invention further include a communication system consisting of the above base station and communication devices. as shown in FIG. 14A, a communication system 1410 according to an embodiment of the invention may includes a base station 1412, a first communication device 1414 and a second communication device 1416. As shown in FIG. 14B, a communication system 1420 according to another embodiment of the invention may include a first base station 1422, a second base station 1426, a first communication device 1424 and a second communication device 1428.

Wherein, the first and second communication devices may perform a D2D communication using an allocated carrier based on a control signaling from the base station. The carrier for D2D communication includes a carrier for D2D communication allocated from conventional carrier, stand-alone NCT and non-stand-alone NCT, wherein the new-type carrier have reduced control channels as compared with the conventional carrier.

However, the communication system according to the embodiment of the invention may consist of other numbers of base stations and/or communication devices. In a case that multiple pairs of communication devices respectively perform a D2D communication, the carrier for D2D communication may be multiplexed in a time-division manner or a frequency-division manner, as mentioned above.

Moreover, in the above description, the number of communication devices in each D2D link is two, that is, a case where two devices are adapted to perform a data communication is considered, but the invention is not limited thereto. For example, in a case of three-way call or multiple-way call, D2D links may also be established between multiple communication devices. In this case, a master communication device may be determined in a way similar to those described above to control the D2D communication.

As an example, steps of the above methods and components and/or units of the above apparatus may be implemented as software, firmware, hardware or a combination thereof. In a case of being implemented as the software and firmware, a program composing a software for implementing the above methods may be loaded from a storage medium or a network to a computer having a special-purpose hardware structure (such as a general-purpose computer 1500 shown in FIG. 15), the computer is able to perform various functions when various programs are installed.

Figure 15:
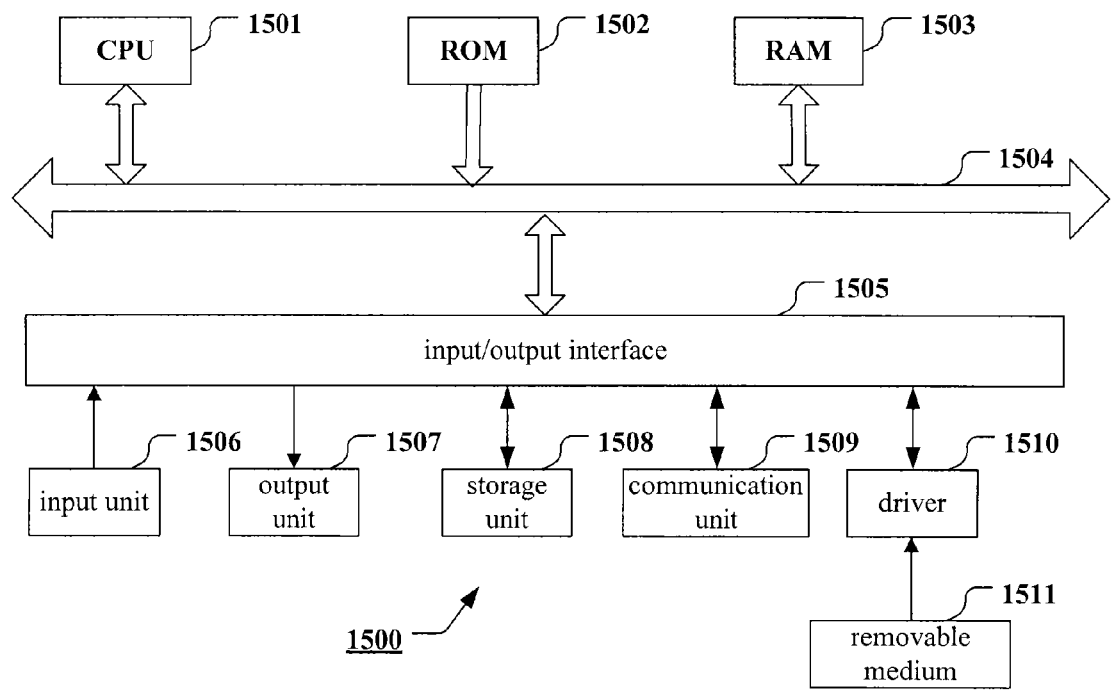
FIG. 15 is a block diagram illustrating an exemplary structure of a computer for implementing a method and a device according to the invention.

In FIG. 15, a calculation processing unit (i.e. CPU) 1501 performs various processes based on programs stored in a read-only memory (ROM) 1502 or programs loaded from a storage unit 1508 to a random access memory (RAM) 1503. Data required for the CPU 1501 to perform various processes is also stored in the RAM 1503 as needed. The CPU 1501, ROM 1502 and RAM 1503 are connected via a bus 1504. An input/output interface 1505 is also connected to the bus 1504.

The following components are connected to the input/output interface 1505: an input unit 1506 (including a keyboard, a mouse, etc.), an output unit 1507 (including a display such as a cathode-ray tube (CRT) and a liquid crystal display (LCD), and a speaker, etc.), a storage unit 1508 (including a hard disk, etc.) and a communication unit 1509 (including a network interface card such as a LAN card, a modem, etc.). The communication unit 1509 performs a communication processing via a network such as Internet. A driver 1510 may also be connected to the input/output interface 1505 if needed. A removable medium 1511, such as a magnetic disk, an optical disk, a magneto-optical disk and a semi-conductor storage, is mounted on the driver 1510 as needed, so that a computer program read from the removable medium 1511 is loaded to the storage unit 1508 as needed.

In a case that the above series of processes are implemented with software, programs composing the software are loaded from a network such as Internet or from a storage medium such as the removable medium 1511.

It should be understood by those skilled that the storage medium is not limited to the removable medium 1511 as shown in FIG. 15, in which programs are stored and which is distributed separately from the device, to provide programs to a user. Examples of the removable medium 1511 include a magnetic disk (including a floppy disk (registered trademark)), an optical disk (including a compact disk read only memory (CD-ROM) and a digital versatile disk (DVD)), a magneto-optical disk (including a mini-disk (MD) (registered trademark)) and a semi-conductor storage. Alternatively, the storage medium may be hard disks contained in the ROM 1502 and the storage unit 1508 and the like, in which programs are stored and which is distributed to the user together with devices containing them.

The invention further proposes a program product storing machine-readable instruction codes. Methods according to the embodiments of the invention can be performed when the instruction codes are read and executed by the machine.

Accordingly, a storage medium for carrying the above program product storing machine-readable instruction codes is also included in the invention. The storage medium includes but is not limited to a floppy disk, an optical disk, a magneto-optical disk, a storage card, a memory stick, and the like.

In the above description of the specific embodiments of the invention, features described and/or shown according to an embodiment may be used in one or more other embodiments in a same or similar way, be combined with features according to other embodiments or replace the features according to other embodiments.

It should be noted that, the terminology "comprise/include" when used in the invention indicates the presence of features, elements, steps or components, but does not preclude the presence or addition of one or more other features, elements, steps and components.

In the above embodiments and examples, reference numerals consisting of numbers are adopted to represent steps and/or elements. It should be understood by those skilled in the art that, the reference numbers are only for description and drawing, but not for representing an sequence thereof or any other limitation.

In addition, the method according to the invention is not limited to be performed in the chronological order described in the specification, and may be performed in other chronological order, in parallel or separately. Therefore, the execution order of the method described in the specification is not construed as limiting the technical scope of the invention.

Preferred embodiments of the invention are disclosed above. However, it should be understood that, all the embodiments and examples in the above are exemplary but not restrictive. Numerous modifications, improvement and equivalents to the invention can be designed by those skilled in the art within the spirit and scope of the invention. These modifications, improvements and equivalents should fall within the protection scope of the invention.

The invention claimed is:

1. A method of controlling wireless communication by a base station, the method comprising:
   determining whether communication devices which are to perform communication satisfy a condition for device-to-device direct communication, and
   in case that the condition is satisfied, transmitting a control signaling to the communication devices, the control signaling allocating a carrier for the device-to-device direct communication,
   wherein the base station allocates the carrier for the device-to-device direct communication from conventional carrier, stand-alone new-type carrier and non-stand-alone new-type carrier, wherein the new-type carriers have a reduced number of control channels as compared with the conventional carrier, control signaling being transmitted using the conventional carrier for the device-to-device direct communication, and data transmission being performed using the non-stand-alone new-type carrier for the device-to-device direct communication.

2. The method according to claim 1, wherein the allocated carrier for the device-to-device direct communication comprises an aggregated carrier consisting of the non-stand-alone new-type carrier and the conventional carrier, wherein the conventional carrier is designated to transmit control signaling, and the non-stand-alone new-type carrier is designated to transmit data between the communication devices.

3. The method according to claim 1, wherein the control signaling is transmitted to the communication devices through broadcast system information or proprietary information for specific communication device, the control signaling indicating the information on and/or supported frequency range of the carrier that can be used for the device-to-device direct communication.

4. The method according to claim 1, where a communication target device and a communication initiating device are in the same cell or in adjacent cells, determining whether the communication devices satisfy the condition for the device-to-device direct communication according to one or more of the following elements: relative movement state of the communication initiating device and the communication target device, whether the communication devices support a manner for the device-to-device direct communication, user security permission of the communication devices, and data volume to be transmitted through the communication.

5. The method according to claim 1, further comprising:
   determining whether a corresponding communication device is a master communication device or a slave communication device, and
   the step of transmitting control signaling to the communication device comprises:
   in case that the corresponding communication device is a master communication device: determining the carrier for the device-to-device direct communication, transmitting a control signaling to the master communication device, and informing a cell of a slave communication device to transmit a corresponding control signaling, wherein the master communication device is designated to perform control during the device-to-device direct communication;
   in case that the corresponding communication device is a slave communication device: transmitting a control signaling to the slave communication device based on a notification from the cell of the master communication device.

6. The method according to claim 5, wherein the master communication device and the slave communication device are determined according to one or more of the following conditions: intensity of a signal received from the corresponding base station, power loss during transmission of a signal received from the corresponding base station, a distance to the corresponding base station and whether the communication device is a communication initiating device or a communication target device.

7. The method according to claim 1, further comprising: when it is detected that the condition for the device-to-device direct communication is not satisfied or information indicating that the condition for the device-to-device direct communication is not satisfied is received from the communication device, performing data transmission by activating an original logical connection, and setting logical connection and communication resource for the device-to-device direct communication into an inactive state.

8. The method according to claim 7, further comprising: after the device-to-device direct communication is stopped, retaining the logical connection and communication resource for the device-to-device direct communication for a predetermined period of time, if the condition for the device-to-device direct communication is re-satisfied in the predetermined period of time, activating the logical connection and communication resource for the device-to-device direct communication, and deactivating the logical connection for network data transmission, to resume the device-to-device direct communication; in case that the condition for the device-to-device direct communication is still not satisfied after the predetermined period of time, releasing the logical connection and communication resource for the device-to-device direct communication.

9. A non-transitory computer storage medium comprising computer readable instructions for causing a computer to perform the method according to claim 1.

10. An apparatus in a wireless communication system, the apparatus comprises circuitry including a processor and a memory for storing computer instructions in the memory and executing the computer instructions stored in the memory by the processor to perform the method according to claim 1.

11. A method of performing a wireless communication by a communication device, the method comprising:
receiving a control signaling from a base station, the control signaling allocating a carrier for device-to-device direct communication; and
performing the device-to-device direct communication with an object communication device using the allocated carrier,
wherein the carrier for the device-to-device direct communication comprises carrier for the device-to-device direct communication allocated from conventional carrier, stand-alone new-type carrier and non-stand-alone new-type carrier, wherein the new-type carriers have a reduced number of control channels as compared with the conventional carrier, control signaling being transmitted using the conventional carrier for the device-to-device direct communication, and data transmission being performed using the non-stand-alone new-type carrier for the device-to-device direct communication.

12. The method according to claim 11, wherein based on a control signaling from the base station, the device-to-device direct communication with the object communication device is performed with an aggregated carrier consisting of the non-stand-alone new-type carrier and the conventional carrier, wherein control signaling transmission is performed with the conventional carrier, and data transmission with the object communication device is performed with the non-stand-alone new-type carrier.

13. The method according to claim 11, wherein in case of being designated as a master communication device by the control signaling transmitted from the base station, performing control and/or communication with the base station during the device-to-device direct communication.

14. The method according to claim 11, wherein the device-to-device direct communication is performed in the following communication manner: a communication manner based on long term evolution or advanced long term evolution, or a communication manner based on wireless local area network.

15. The method according to claim 11, further comprising: in case of being in the same cell as the object communication device or in an adjacent cell of the object communication device, performing a peer to peer detection with the object communication device to determine whether a condition for the device-to-device direct communication is satisfied.

16. The method according to claim 11, further comprising: in case that the device-to-device direct communication is not satisfied during the device-to-device direct communication, transmitting information indicating that the device-to-device direct communication is not satisfied to a corresponding base station.

17. A base station, comprising:
circuitry including a processor and a memory, the circuitry configured to:
determine whether communication devices which are to perform communication satisfy a condition for device-to-device direct communication, and
in case that the condition is satisfied, transmit a control signaling to the communication devices, the control signaling allocating a carrier for the device-to-device direct communication,
wherein the carrier for the device-to-device direct communication comprises carrier for the device-to-device direct communication allocated from conventional carrier, stand-alone new-type carrier and non-stand-alone new-type carrier, wherein the new-type carriers have a reduced number of control channels as compared with the conventional carrier, control signaling being transmitted using the conventional carrier for the device-to-device direct communication, and data transmission being performed using the non-stand-alone new-type carrier for the device-to-device direct communication.

18. A wireless communication device, comprising:
circuitry including a processor and a memory, the circuitry configured to:
receive a control signaling from a base station, the control signaling allocating a carrier for device-to-device direct communication; and
perform the device-to-device direct communication with an object communication device using the allocated carrier,
wherein the carrier for the device-to-device direct communication comprises carrier for the device-to-device direct communication allocated from conventional carrier, stand-alone new-type carrier and non-stand-alone new-type carrier, wherein the new-type carriers have a reduced number of control channels as compared with the conventional carrier, control signaling being transmitted using the conventional carrier for the device-to-device direct communication, and data transmission being performed using, the non-stand-alone new-type carrier for the device-to-device direct communication.

* * * * *